Aug. 16, 1932.     G. D. GARDNER     1,871,507
FRUIT PROCESSOR
Filed April 1, 1929     3 Sheets-Sheet 1
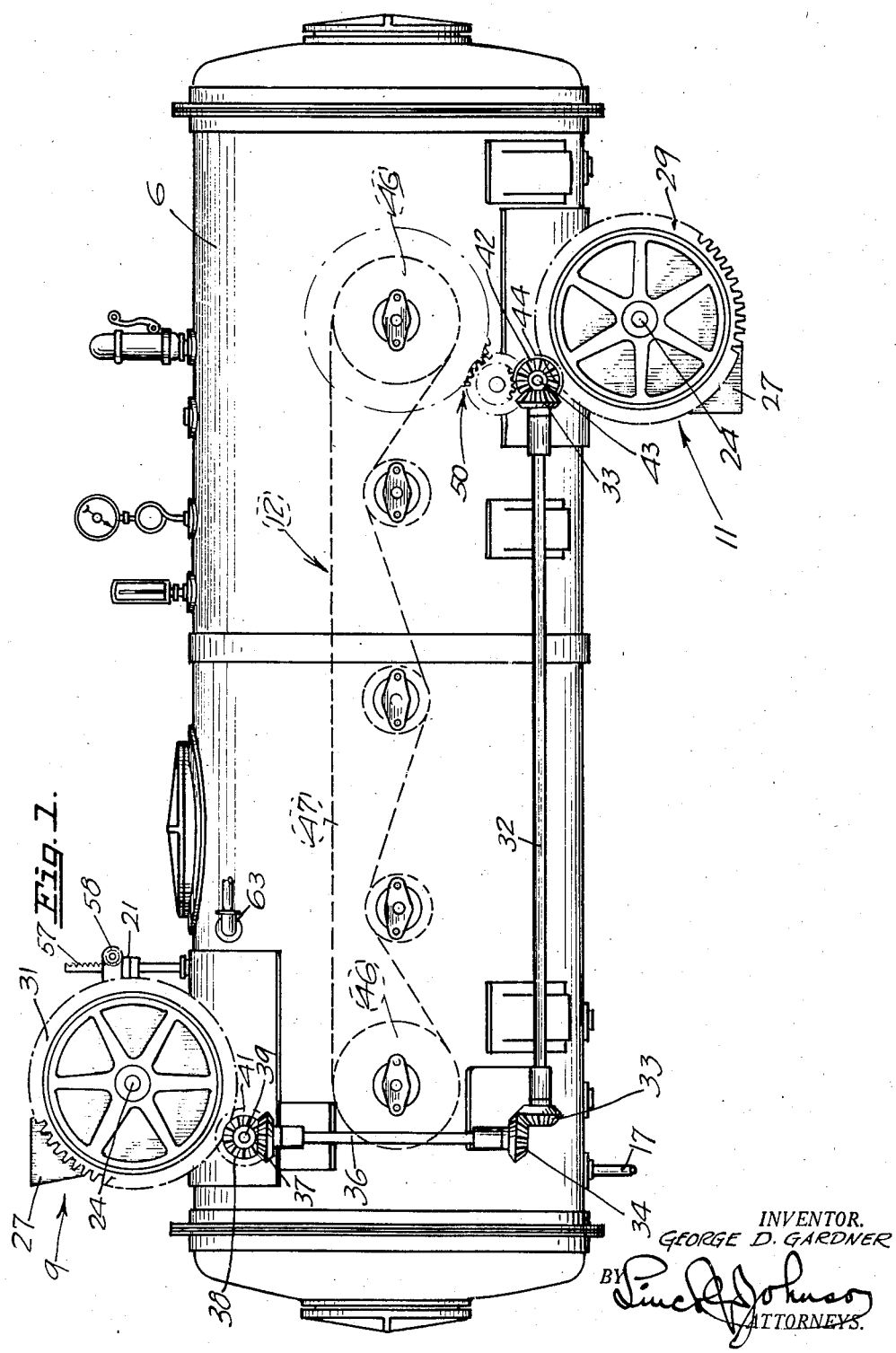
INVENTOR.
GEORGE D. GARDNER
BY
ATTORNEYS.

Aug. 16, 1932.   G. D. GARDNER   1,871,507
FRUIT PROCESSOR
Filed April 1, 1929   3 Sheets-Sheet 2
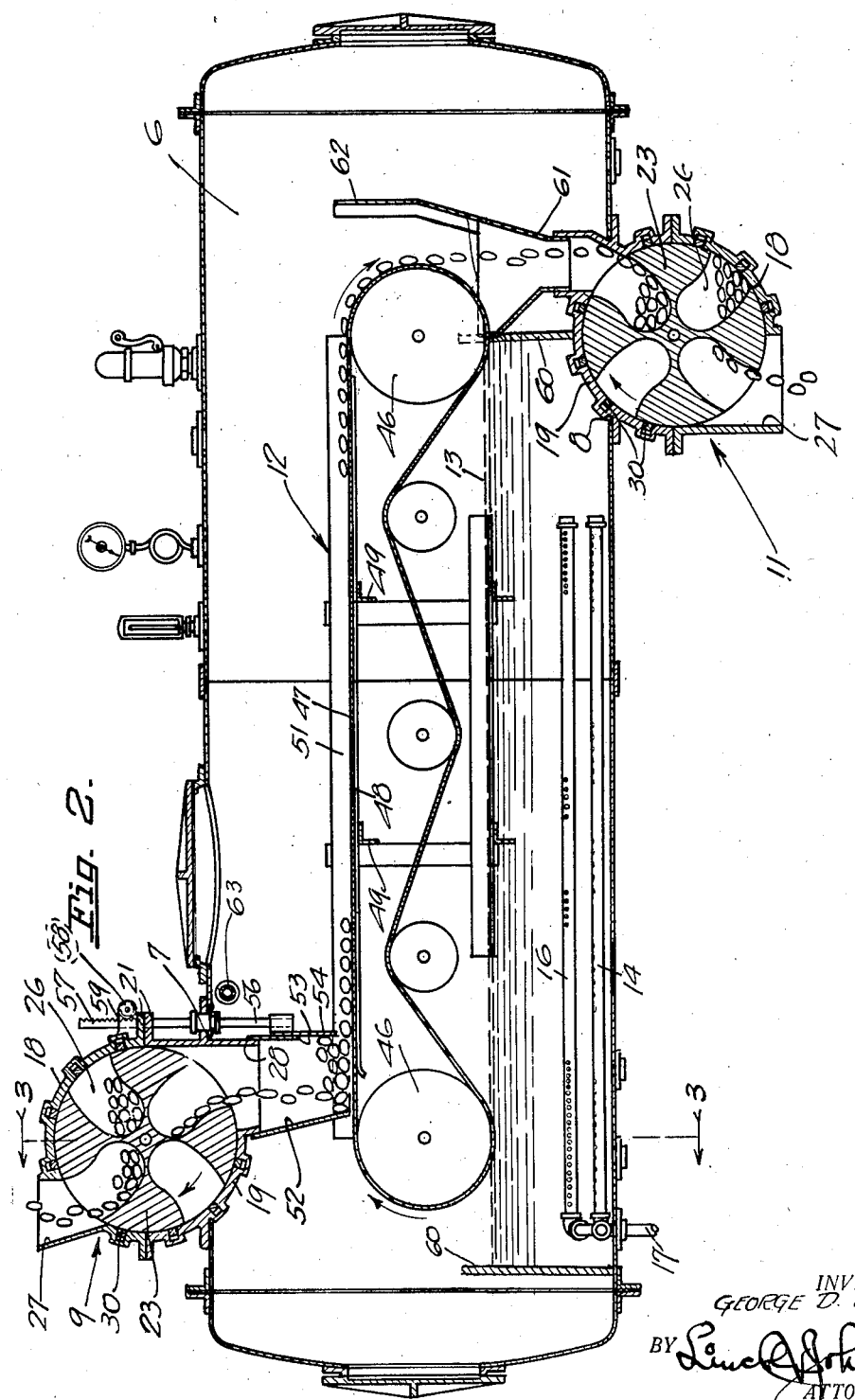
INVENTOR.
GEORGE D. GARDNER
BY
ATTORNEYS.

Aug. 16, 1932.  G. D. GARDNER  1,871,507
FRUIT PROCESSOR
Filed April 1, 1929   3 Sheets-Sheet 3
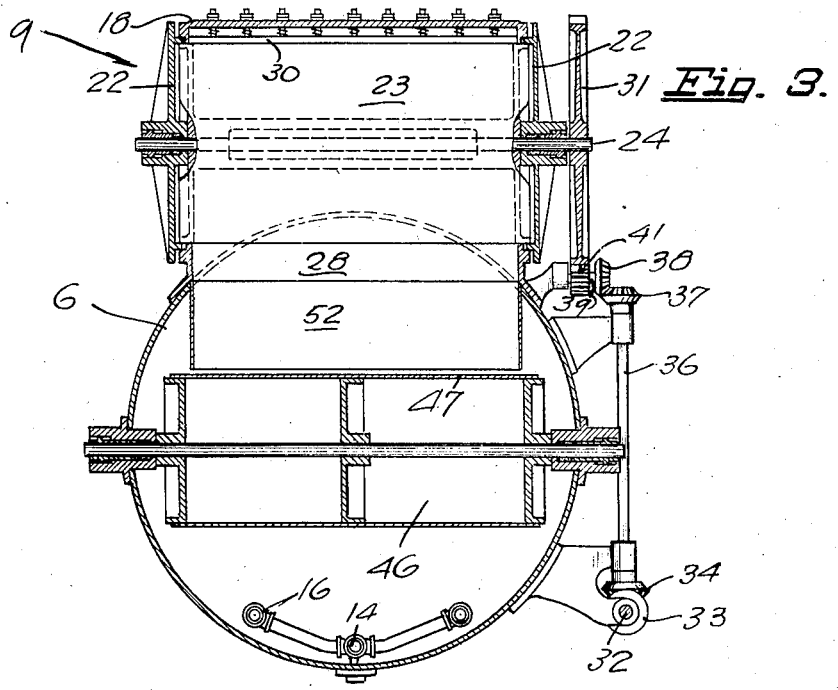
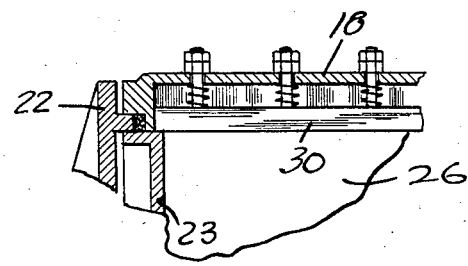
INVENTOR.
GEORGE D. GARDNER
BY
ATTORNEYS.

Patented Aug. 16, 1932

1,871,507

UNITED STATES PATENT OFFICE

GEORGE D. GARDNER, OF SAN JOSE, CALIFORNIA, ASSIGNOR TO GARDNER MANUFACTURING COMPANY, LTD., OF SUNNYVALE, CALIFORNIA, A CORPORATION OF CALIFORNIA

FRUIT PROCESSOR

Application filed April 1, 1929. Serial No. 352,332.

The invention forming the subject matter of this application relates to pressure fruit processors.

The difficulties in the keeping and transportation of fresh fruit is primarily due to the presence of unorganized compounds such as enzymes in the fruit which, when exposed to the atmosphere, oxidize and cause the fermentation of the fruit. While there are certain processes of preservation by which the fermantation is prevented, to date there are no methods or processes provided by which fresh fruits could be so treated as to retard or entirely prevent the oxidization of the enzymes, or other unorganized compounds therein, when the fruit is exposed to the atmosphere after the treatment, without affecting the natural qualities of the fresh fruit.

The sterilization of foods by boiling may accomplish the result so as to preserve the fruit or vegetable for a certain period of time after its exposure to the atmosphere, but usually the boiling process changes the natural taste and flavor of the fruit or vegetable to such an extent that it would be impractical to use the same in instances where the intention is to retain the original natural taste, color and flavor of the fresh fruit.

One of the methods of preserving fruit is the preservation by drying. In the process of drying, the moisture content of the fruit is reduced to such a point that spoilage cannot occur, but it is evident that by such preservation the fruit entirely loses its juicy content and the product is a fruit of different characteristics than the fresh fruit. Another mode of preservation is concentration or jellifying the juices of the fruit where the preservation largely depends upon the fact that with the concentration, a liquid becomes greater than the cell sap of the microorganisms and they become plasmolyzed and are unable to grow. There are other methods of preserving the fruit such as by filtration, sealing or by the use of chemicals, but in all of the processes used up to this time, while fermentation is prevented, the natural characteristics are also changed to a great extent.

The primary object of the invention is the provision of a fruit processor particularly for the treatment of dried fruit, in which the cells of the dried fruit are saturated with moisture, under pressure, and under suitable heat, so that the heat opens the pores of the skin of said fruit and the moisture penetrates the cells or pulp of the fruit and swells the same near to its original form, whereby the fruit is not only sterilized but it also assumes its nearly natural, fresh appearance in regard to size, shape and color.

Another object of the invention is the provision of a fruit processor in which the fruit is carried on a suitable carrier from the inlet to the outlet opening of a vessel, the vessel being filled with steam of suitable pressure and temperature to neutralize or kill the oxidizing enzymes or other microorganisms that usually cause the comparatively rapid fermentation and spoiling of the fruit when exposed to the atmosphere; the time of exposal of the fruit to the action of the steam being so regulated as to kill the microorganisms or the enzymes in the fruit without destroying the natural color, taste and juiciness of the fruit.

Another object of the invention is the provision of a closed vessel having an intake and outlet opening therein, and means in the vessel to carry the fruit from the intake to the outlet opening of the said vessel; the vessel being filled with steam of suitable pressure and temperature and the speed of the carrying mechanism being such as to expose the fruit to the effect of the steam for the time necessary for the sterilization and saturation of the fruit to a certain extent without destroying the natural flavor, color and appearance of the fruit.

Another object of the invention is the provision of a fruit processor which is adapted to carry fruits through a chamber filled with steam of suitable pressure and temperature and which is capable of handling fruits of various sizes and quantities; said processor having means thereon to effect the adjustment of its continuous operation to suit the particular fruits handled.

Another object of the invention is the provision of a fruit processor including a closed vessel having an inlet and an outlet therein, means being provided to carry the fruit handled from the inlet to the outlet opening; said inlet and outlet openings having valves thereon controlling the intake and discharge of the fruits from the vessel, and being adapted to prevent the escapement of steam from or the entering of air into the said vessel; means being provided to actuate said valves and said carrying mechanism; furthermore, a steam inlet is provided in said vessel arranged in such a manner as to allow the introduction of steam therethrough.

Another object of the invention is the provision of a fruit processor of the character described, above the fruit carrier mechanism of which is a sprayer operated at will to increase the moisture of the fruit carried through the steam chamber when it is so required, in order to provide additional moisture to the fruit while subjected to said steam treatment.

Other objects and advantages are to provide a fruit processor that will be superior in point of simplicity, inexpensiveness of construction, positiveness of operation, and facility of convenience in use and general efficiency.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

The invention is clearly illustrated in the accompanying drawings in which

Fig. 1 is a side elevation of the fruit processor;

Fig. 2 is a longitudinal section of the fruit processor;

Fig. 3 is a cross section taken on the line 3—3 of Fig. 2; and

Fig. 4 is a fragmentary sectional view of a juncture of the valve casing, the cover plate therefor and the rotating valve, also showing the arrangement of the packing in the casing.

The properly dried fruit retains all its food value, and palatability, and also retains its natural color. The fermentation in the dried fruit is arrested, but the appearance of the fruit is sacrified to a certain degree because the skin of the dried fruit becomes wrinkled, due to the contraction of the dried cells or the reduced volume of the dried pulp. The swelling of the dried fruit is usually effected by boiling, in the course of which the fruit looses its natural bouquet, and the color of the skin of the fruit changes. In my processor, the swelling of the cells of a dried fruit is effected by driving the required moisture into the cells of the fruit without boiling the fruit. This addition is effected by a limited heat to open the pores of the skin, and by suitable pressure to cause the moisture to penetrate the cells of the dry fruit to the core thereat, producing the natural juiciness of the dried fruit, but still retaining the natural color of the skin.

The treatment of a dried fruit for saturating the cells thereof, with the desired moisture, accomplished by subjecting the dried fruit to the action of heat, is not in itself sufficient to boil the fruit, but sufficient to open the pores of its skin; and the subjecting of the fruit to suitable pressure under such conditions as to drive the moisture through the skin into the cells and swell the same. In order to achieve this treatment the dried fruit is carried through a chamber filled with steam of suitable pressure and temperature to swell the fruit without boiling the same.

In carrying out my invention I make use of a closed vessel 6, having an inlet opening 7 and an outlet opening 8 thereon, fitted with suitable valves 9 and 11. The structure of said valves will be hereinafter set forth in detail.

The vessel is provided with the usual openings, instruments, manholes and covers, for checking upon the steam and temperature conditions therein, and for allowing the cleaning of the vessel. In the vessel is operatively disposed and supported a fruit carrying mechanism 12 which is so operated as to carry the fruit from the intake opening 7 toward the outlet opening 8 of the vessel 6. The structure of the carrier mechanism 11 and its operation will be hereinafter described in detail.

The vessel is partly filled with water to the level designated by the numeral 13. It will be noted that the water level 13 washes the under side of the carrying mechanism 12.

The steam is introduced into the vessel 6 through perforated conduits 14 and 16 which are the branches of a main steam line 17 through which the steam is conducted to the vessel 6.

The valves 9 and 11 through which the fruits pass into and out of the vessel 6 are identical in structure, therefore it will be sufficient to describe the structure and operation of one of said valves so as to understand the operation of both.

The valve 9 comprises a casing constructed of an outer half 18 and an inner half 19 secured to each other by means of the respective complemental flanges 21. The two halves of the casing enclose a substantially cylindrical space which is terminated at the opposite ends thereof by means of cover plates 22 suitably secured to the casing. Within the casing is rotatably held a cylindrical rotary valve 23 which is also supported in the cover plates 22 by means of a shaft 24 of said rotary valve 23, which shaft extends through suitable packings and bearings in the cover plates 22. The rotary valve 23 is provided with pockets 26 which are slightly curved in radial direction and extend substantially in parallelism with the axis of the valve 23. The pockets 26 are open only at the outer periphery of the rotary valve 23 and each pocket has a rounded bottom close to the center of the rotary valve 23. The radial curvature of each pocket 26 is formed in the direction of rotation of said valve.

In the upper half 18 of the valve casing is formed an inlet slot 27 in the shape of a hopper so as to allow the intake of the fruit from above. The corresponding opening on the outer casing of the valve 11 serves as an outlet opening thru which the fruits are discharged. The inner half 19 of the casing has an outlet hopper 28 formed thereon so that the same extends into the interior of the vessel 6 and above the intake side of the fruit carrier 12. The corresponding opening in the inner half 19 of the casing of the valve 11 operates as an inlet of the valve 11 and is so disposed as to receive the fruit discharged from the fruit carrying mechanism 12.

It is to be noted that the valves 11 and 9 are rendered air tight by means of a series of packings 30 which extend axially in suitable grooves spacedly disposed on the inner periphery of the respective halves 18 and 19 of the casing and are resiliently held in place and pressed against the outer periphery of the rotary valves 23 so as to prevent the escapement of any fluid or air past the outer periphery of the rotary valve 23. It is also to be noted, as shown in Figs. 3 and 4, that the casings 18 and 19 have narrower end walls than the width of the outwardly flanged end of the rotary valve 23, and while the outer faces of the casings 18 and 19 are flush with the respective ends of the rotary valve 23, the inner faces of the respective ends of the casings 18 and 19 are set back from the respective ends of the pockets 26, thereby allowing the packings 30 to rest upon the outer periphery of the rotary valves 23 at all times regardless of the positions of the pockets 26 relatively to the packings 30.

The rotary valves 23 are rotated by means of a gear transmission which comprises a large gear 29 on the valve 11 and a similar large gear 31 on the valve 9. The gears 29 and 31 are mounted on the end of the respective rotary valve shafts 24. Rotation is transmitted to the gears 29 and 31 from a drive shaft 32 supported on the outside of the vessel 6 and having bevel gears 33 on the opposite ends thereof. The bevel gear 33 adjacent to the intake end of the vessel 6, is in mesh with a companion gear 34 which rotates a vertical shaft 36 having another bevel gear 37 on the upper end thereof. The gear 37 is in mesh with a bevel gear 38 for rotating a horizontally disposed shaft 39 upon which is a driving gear 41 in mesh with the gear 31 of the rotary valve.

The bevel gear 33 adjacent to the outlet end of the vessel 6 is in mesh with a companion bevel gear 42 which rotates a horizontal shaft upon which is mounted a driving gear 44 in mesh with the driven gear 29 of the outlet valve. The drive shaft 32 may be rotated in any suitable manner whereby the simultaneous rotation of the valves 9 and 11 is effected so that the operation of the valves is synchronized.

The carrying mechanism 12 in the vessel 6 comprises drums 46 rotatably supported in suitable bearings within the vessel 6. It is to be noted that the drums are disposed in parallelism and in vertical alignment with the rotary valves 9 and 11 and that both the drums 46 and the valves 9 and 11 extend transversely to the vessel 6.

The drums 46 are adapted to carry an endless conveyor belt 47 and to move the same around in the usual manner. The drums 46 are rotated by any suitable means such as the gearing 50 in a clockwise direction, viewing Fig. 2, so that the top of the conveyor belt moves from the inlet toward the outlet end of the vessel 6. The conveyor belt 47 is made of woven netting so as to allow the dripping of the moisture therefrom and thereby the draining of any excessive moisture that may be deposited upon the fruit while carried thereon. In order to maintain the upper branch of the endless conveyor belt 47 in a straight plane, a supporting plate 48 is mounted on cross members 49 over which the conveyor belt 47 is guided in a straight horizontal plane. Adjacent to the opposite edges of the conveyor belt 47 are vertical guides 51 preferably mounted on the supporting plate 48 extending from drum to drum so as to prevent the escapement of the fruit from the conveyor belt 47.

At the intake end of the conveyor or carrier 12 is formed a hopper 52 having an opening 53 on the side thereof facing toward the discharge end of the processor. The hopper 52 extends in continuation of the outlet 28 of the valve 9, so as to receive the fruit discharged from the respective pockets 26. Inasmuch as the present processor is adapted to handle a great variety of fruits, the outlet opening 53 is made adjustable to accommodate fruits of different sizes. In order to control the opening 53, a gate 54 is slidably supported thereover upon a rod 56, which rod extends through suitable packing bearings outside of the vessel 6. The outer end of the rod 56 is formed in the shape of a rack 57 which is engaged by a gear 58, the latter being supported in a bracket 59 upon the outer half 18 of the valve casing. The gear 58 is adapted to lock in any position or to be rotated at will, thereby moving the rod 56 up or down so as to raise or lower the gate 54, thus adjusting the outlet opening from the hopper 52 to accommodate fruits of a certain size.

Below the discharge end of the carrier mechanism 12 is another hopper 61 which extends into the opening of the inner casing half 19 of the valve 11. It is to be noted that the hopper 61 has an upward extension 62 thereon facing the discharge end of the carrying mechanism 12 so as to prevent the escapement of the fruit over the top of the hopper 61 when the fruits are discharged from the conveyor belt 47. It is also to be noted that the hopper 61 is so constructed as to prevent the communication of water from the vessel 6 through the opening of the valve 11. Baffles 60 confine the water in the bottom of the vessel 6, so that the ends of the vessel are free of said water.

In case additional moisture is required in the steam chamber of the vessel 6, this may be provided by means of a spray conduit 63 which consists of a perforated pipe extending across the vessel 6 above the intake side of the carrying mechanism 12 so that the fruit passing therethrough may be sprayed at will.

In operation the fruits are fed into the intake 27 of the valve 9. The valves 9 and 11 are rotated and the drums 46 are also rotated so as to move the conveyor 47 in the desired direction. The vessel 6 is filled with steam of the desired pressure and temperature. The lower portion of the vessel is filled with water so that the water line 13 washes the lower faces of the drums 46 and the woven netting conveyor 47 at said points.

When a pocket 26 of the valve 9 is brought into registry with the intake 27, the fruit falls into said pocket and is carried around thereby to the outlet opening 28 of the valve 9 and discharged therethrough into the hopper 52 and upon the endless belt 47. The fruit usually piles up against the gate 53 which is so adjusted as to allow only one row of fruit to pass therebelow. Consequently, the fruit will pile up and the gate 53 operates as a distributor whereby the fruit is distributed throughout the entire width of the conveyor belt 47 and is permitted to pass in single rows below the lower edge of the gate 53.

The conveyor is driven at the desired rate of speed and it carries the fruit through the steam chamber for a sufficient length of time to kill the bacteria or enzymes usually causing the rapid fermentation of fresh fruits, and to swell the fruit, by penetrating the cell thereof with moisture. If it is so required, in connection with certain fruits, to supply additional moisture during the steam treatment, a fluid is discharged through the spray 63. The fruits are carried by the conveyor belt 47 and are discharged into the hopper 61 from which they are carried away by the pockets 26 of the rotary valve 23 in the valve 11 and are discharged therefrom in the manner heretofore set forth into any suitable container.

It will be recognized that the pressure in the processor and also the temperature may be regulated to suit different kinds of fruits so that the particular fruit is subjected by this processor to a pressure and heat treatment which merely neutralizes or kills the most destructive organisms that may cause rapid fermentation, and fills the cells with moisture, but it does not spoil or otherwise change the natural flavor, juices, or even the appearance of the fruits. It will also be noted, that once the processor is adjusted to the required pressure and temperature, the operation thereof is continuous, therefore it readily lends itself to the treatment of fruit on a large scale. The process or once assembled and adjusted does not require any further adjustment and after its particular adjustment, may be readily controlled and operated by the labor ordinarily available.

Having thus described this invention, what I claim and desire to secure by Letters Patent is:

1. In a fruit processor of the character described, a closed vessel having an inlet and outlet opening thereon, means for supplying steam to said vessel; a conveyor adapted to carry the fruit from the inlet to the outlet opening; gate means in operative relation to said inlet opening adapted to distribute fruit on said conveyor in a single stratum and means for packing said inlet and outlet openings being adapted to deliver the fruit through the respective openings to and from said conveyor.

2. In a fruit processor of the character described, a closed vessel having an inlet and outlet opening thereon, means for supplying steam to said vessel; a conveyor in said vessel adapted to carry the fruit from the inlet to the outlet opening; valve means cooperating with said inlet and outlet openings and adapted to deliver the fruit through the respective openings to and from said conveyor, said conveyor comprising an endless conveyor belt adapted to permit the draining of moisture therethrough, means within said vessel and below said conveyor to receive and hold liquid, and means to move said belt so as to carry the fruit deposited thereon toward the outlet opening.

3. In a fruit processor of the character described, a closed vessel having an inlet and outlet opening thereon, means for supplying steam to said vessel; a conveyor adapted to carry the fruit from the inlet to the outlet opening; means for packing said inlet and outlet openings and adapted to deliver the fruit through the respective openings to and from said conveyor without substantial loss of pressure from said closed vessel; and means operatively related to the inlet end of the conveyor to distribute the fruit over the entire width of the conveyor and cause the same to pass in a single stratum.

4. In a fruit processor of the character described, a closed vessel having an inlet and outlet opening thereon, means for supplying steam to said vessel; a conveyor adapted to carry the fruit from the inlet to the outlet opening; means for packing said inlet and outlet openings and adapted to deliver the fruit through the respective openings to and from said conveyor without substantial loss of pressure from said closed vessel; and means operatively related to the inlet end of the conveyor to distribute the fruit over the entire width of the conveyor and cause the same to pass in a single stratum, said distributing means being adjustable so as to accommodate fruits of various sizes.

5. In a fruit processor of the character described, a closed vessel having an inlet and outlet opening thereon, means for supplying steam to said vessel; a conveyor adapted to carry the fruit from the inlet to the outlet opening; means for packing said inlet and outlet openings and adapted to deliver the fruit through the respective openings to and from said conveyor without substantial loss of pressure from said closed vessel; means operatively related to the inlet end of the conveyor to distribute the fruit over the entire width of the conveyor and cause the same to pass in a single stratum, said distributing means being adjustable so as to accommodate fruits of various sizes; and means operatively related to the conveyor to prevent the accidental escapement of the fruit from the conveyor into the vessel.

6. A fruit processor comprising a closed vessel having an inlet and an outlet opening thereon, said vessel being filled with steam and having a liquid in the lower portion thereof; a conveyor in said vessel capable of carrying the fruit through the steam from the inlet to the outlet of the vessel, a packing valve in the inlet opening, a second packing valve in the outlet opening of the vessel, said packing valves being adapted to deliver the fruit through the respective openings; a hopper for guiding the fruit from the inlet packing valve onto the inlet end of the conveyor; a second hopper for receiving the fruit discharged from the conveyor and guiding the same into said outlet packing valve; a distributing gate slidably disposed over the outlet of the intake hopper, means to adjust the spacing of the distributor plate from the surface of the conveyor so as to cause the distribution of the fruit over the entire width of the conveyor and the passing of the fruit in a single layer upon the conveyor; and means to actuate said packing valves.

7. A fruit processor comprising a closed vessel having an inlet and an outlet opening therein, means for supplying steam to said vessel, a conveyor in said vessel capable of carrying the fruit through the steam from the inlet to the outlet of the vessel, a positive feeding valve in the inlet opening, a second positive feeding valve in the outlet opening of the vessel, said valves being adapted to deliver the fruit through the respective openings; a hopper for guiding the fruit from the inlet valve onto the inlet end of the conveyor; a second hopper for receiving the fruit discharged from the conveyor and guiding the same into said outlet valve; a distributing gate slidably disposed over the outlet of the intake hopper, means to adjust the spacing of the distributor plate from the surface of the conveyor so as to cause the distribution of the fruit over the entire width of the conveyor and the passing of the fruit in a single layer upon the conveyor; and means for actuating said conveyor and valves in timed relation.

8. An apparatus for processing fruit, comprising a closed vessel provided with an inlet and an outlet opening, a conveyor in said vessel capable of carrying fruit from the inlet to said outlet, means operatively related to the inlet end of the conveyor to distribute the fruit over the entire width of the conveyor and cause the same to pass in a single stratum, and means for spraying said fruit when carried upon said conveyor in said vessel.

9. An apparatus for processing fruit, comprising a closed vessel provided with an inlet and an outlet opening, a conveyor in said vessel capable of carrying fruit from said inlet to said outlet, packing valves positioned at said inlet and outlet openings, said valves being adapted to deliver fruit through the respective openings to and from said conveyor, means operatively related to the inlet packing valve and adapted to distribute the fruit over the entire width of the conveyor and cause the same to pass in a single stratum, and means for actuating said packing valves in synchronism with each other.

10. In a fruit processor of the character described, the combination of a closed vessel having an inlet and an outlet opening therein, means for supplying steam to said vessel, a conveyor belt mounted within said vessel and adapted to carry fruit from the inlet to the outlet opening, valve means cooperating with said inlet and outlet openings and adapted to deliver fruit through the respective openings to and from said conveyor belt, means within said vessel and below said conveyor belt to receive and hold liquid so as to wash the belt at its lowermost point of travel, and means for driving said conveyor belt and actuating said valves.

11. In a fruit processor of the character described, the combination of a closed vessel having an inlet and an outlet opening, means for supplying steam to said vessel, a conveyor belt mounted within said vessel and adapted to carry fruit from the inlet to the outlet opening, valve means cooperating with said inlet and outlet openings and adapted to deliver fruit through the respective openings to and from said conveyor belt, a spray means for liquid positioned above said conveyor, means for supplying liquid to said spray means, means within said vessel and below said conveyor belt to receive and hold liquid so as to wash the belt at its lowermost points of travel, and means for driving said belt and actuating said valves.

12. In a fruit processor of the character described, a closed vessel having an inlet and an outlet opening, means for supplying steam to said vessel, a conveyor belt mounted within said vessel and adapted to carry fruit from the inlet to the outlet opening, valve means cooperating with said inlet and outlet openings and adapted to deliver fruit through the respective openings to and from said conveyor belt, gate means positioned within the vessel in operative relation to said inlet opening adapted to distribute fruit on the conveyor belt in a single stratum, means for adjustably positioning said gate means from a point exteriorly of said vessel, and means for driving said belt and actuating said valve.

In testimony whereof, I have hereunto set my hand at San Jose, California, this 5th day of March 1929.

GEORGE D. GARDNER.